(12) United States Patent
Afromowitz

(10) Patent No.: US 7,045,089 B2
(45) Date of Patent: May 16, 2006

(54) FABRICATION OF MOLDS AND MOLD COMPONENTS USING A PHOTOLITHOGRAPHIC TECHNIQUE AND STRUCTURES MADE THEREFROM

(76) Inventor: Martin A. Afromowitz, 4429 Forest Ave., Mercer Island, WA (US) 98040

( * ) Notice: Subject to any disclaimer, the term of this patent is extended or adjusted under 35 U.S.C. 154(b) by 484 days.

(21) Appl. No.: 10/340,244

(22) Filed: Jan. 10, 2003

(65) Prior Publication Data

US 2004/0134880 A1    Jul. 15, 2004

Related U.S. Application Data

(60) Provisional application No. 60/347,799, filed on Jan. 11, 2002.

(51) Int. Cl.
*B29C 33/38* (2006.01)

(52) U.S. Cl. .................. 264/494; 205/70; 216/26; 264/139; 264/219; 264/255

(58) Field of Classification Search .............. 264/138, 264/219, 220, 225, 255, 494, 139; 205/70; 216/26
See application file for complete search history.

(56) References Cited

U.S. PATENT DOCUMENTS

| | | | | |
|---|---|---|---|---|
| 3,734,449 A | * | 5/1973 | Itou et al. ................. | 249/114.1 |
| 4,285,901 A | * | 8/1981 | Yotsutsuji et al. .......... | 264/225 |
| 5,260,014 A | * | 11/1993 | Holton et al. ............... | 264/134 |
| 5,437,647 A | * | 8/1995 | Firth et al. .................. | 604/110 |
| 6,800,234 B1 | * | 10/2004 | Ferguson et al. ........... | 264/220 |

* cited by examiner

*Primary Examiner*—Allan R. Kuhns
(74) *Attorney, Agent, or Firm*—Jensen & Puntigam, P.S.

(57) ABSTRACT

The method includes the step of forming a solid epoxy member on a substrate, the epoxy member having an upper surface of desired configuration. A first metal layer is deposited on the epoxy member with the upper surface thereof conforming to the desired configuration. A layer of epoxy is deposited on the first metal layer and epoxy material from the epoxy layer is removed to create a well, exposing the metal layer on the epoxy member. A metal impression layer is then deposited in the well. The metal impression layer is then removed from the well and affixed to a mounting member as a mold component for injection molding of small structures.

10 Claims, 4 Drawing Sheets

Fully cross-linked SU-8 structure, 100
Substrate 50

Thin metal layer, 120

SU-8 film, 130

Second mask 142

Opaque area 143 of second mask of diameter $D'$

Fully cross-linked SU-8 structure, hidden underneath mask

Polymerizing light

Second mask, 142

Opaque area of second mask 143

Second mask 142

Alignment notch or key, 150

Fully cross-linked, non-rotationally symmetric SU-8 structure, hidden underneath mask Cross-section of walls of generally circular well 140, fabricated of fully cross-linked SU-8, of diameter $D'$ and of height $H$ FIG. 5
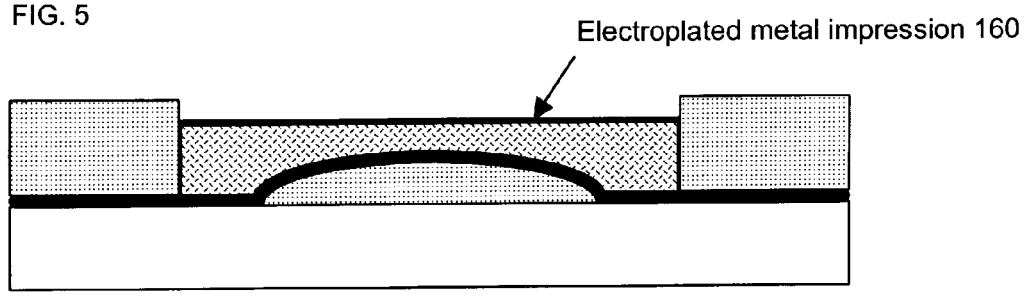
Electroplated metal impression 160
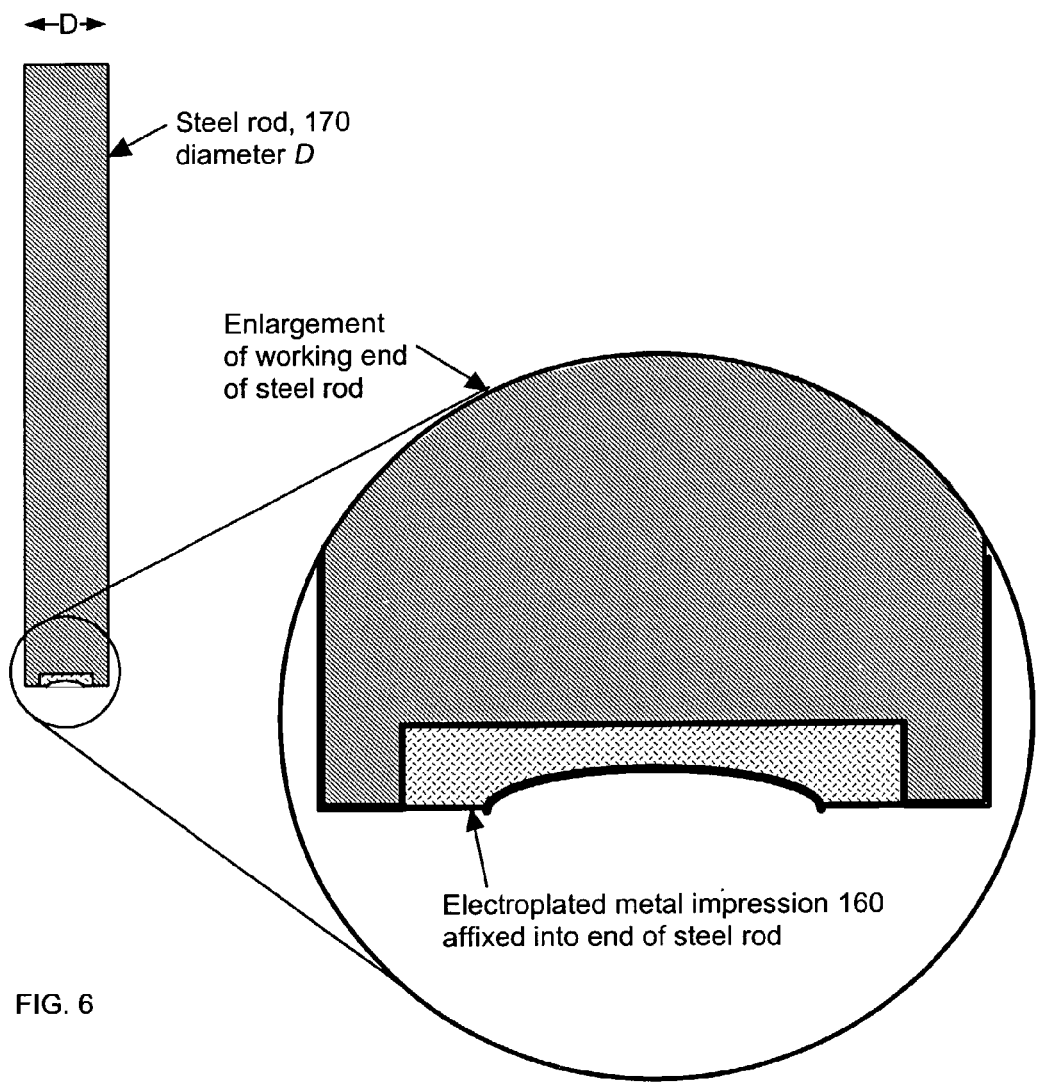
Steel rod, 170 diameter D
Enlargement of working end of steel rod
Electroplated metal impression 160 affixed into end of steel rod
FIG. 6

FABRICATION OF MOLDS AND MOLD COMPONENTS USING A PHOTOLITHOGRAPHIC TECHNIQUE AND STRUCTURES MADE THEREFROM

PRIOR APPLICATION

This non-provisional application claims the priority of corresponding provisional patent application Ser. No. 60/347,799, filed on Jan. 11, 2002.

TECHNICAL FIELD

The present invention relates to techniques for fabricating molds and components used in molds, for use primarily in injection molding applications, and to the structures that may be made in such molds or molds comprising such components. In particular, the molds or mold components have working surfaces which are smoothly curved, such as may be used for molding integrated optical structures comprising small lenses and the like.

BACKGROUND OF THE INVENTION

Injection molding is a common technique for manufacturing small plastic structures in large quantity at low cost. When such structures comprise smoothly curved surfaces such as lens-like elements with maximum convexity or concavity less than or equal to a few millimeters, mold manufacturers generally use mold inserts, which are steel rods with diameters slightly larger than that of the lens-like structure, having a diamond-turned surface at the working end of the insert that faithfully reproduces the desired convex or concave lens-like surface shape. These inserts are then placed in machined holes in the molds, becoming an integral part thereof, with the working surface of the mold generally continuous with the working surface of the mold insert. It is common that the company making molds for injection molding applications contracts with a diamond turning company to provide the inserts. A first disadvantage of this technology is that the diamond turning company may take a considerable amount of time to fabricate the inserts required for a mold. On many occasions, after the initial delivery of the mold and testing of plastic integrated optical structures made therefrom, the mold fabricators' customer may require that the mold inserts be modified, in an attempt to secure the best optical performance of the plastic structure, which incurs further long delays. This long turn-around time greatly increases product development time and may be unacceptable in a competitive marketing situation. A second disadvantage of this technology is the high cost of fabricating the diamond turned inserts, which increases the costs of the mold, and ultimately, the cost of the plastic integrated optical structure. A third disadvantage of this technology is that the conventional diamond turning process itself is limited in the surface shapes that it can create: All such surfaces must have rotational symmetry. In fact, a common class of lens shapes, the cylindrical lens, does not conform to this requirement. Another common lens shape that does not have rotational symmetry is the toric lens, which in a larger scale is commonly used as an eyeglass lens for the correction of astigmatism. This lens exhibits two peaks and two valleys per rotation of the lens, and may be considered to be a combination of a rotationally symmetric spherical lens and a non-rotationally symmetric cylinder lens. This lens shape also cannot be fabricated using conventional diamond turning. The present invention solves one or more of the above discussed disadvantages.

DISCLOSURE OF THE INVENTION

The present invention comprises a new process by which 3-D structures with unrestricted smoothly varying topographic features and continuously varying thickness up to 2 mm can be fabricated in metal using a novel photolithographic process followed by a metal plating process. The resulting 3-D structures can be affixed to the working end of steel rods, forming mold inserts with unrestricted smoothly varying working surface topographies.

A photolithographic process is used to create, on a substrate, a fully cross-linked 3-D structure with unrestricted smoothly varying topographic features and continuously varying thickness in a negative-acting photosensitized epoxy-based photoresist material such as SU-8 resin. A second photolithographic process is used to create a generally circular well around the said 3-D structure, also using a material such as SU-8 resin.

The photolithographic processes are followed by a standard metal plating process, such as a nickel plating process, thereby forming a metal impression comprising surfaces that match those created in the 3-D structure. The metal impression is removed from the substrate and affixed to the end of a steel rod, completing the fabrication of a mold insert.

The present invention eliminates one of more of the disadvantages of the diamond turning technology commonly used to fabricate mold inserts. Our process for making mold inserts is faster and cheaper than diamond turning. In addition, the surface shapes that can be created are not limited to those that are rotationally symmetric.

BRIEF DESCRIPTION OF THE DRAWINGS

FIG. 5 is a cross-sectional view as in FIG. 4, with the addition of an electroplated metal impression within the generally circular well, said metal impression comprising a surface that conforms to the shape of said fully cross-linked SU-8 resin structure having unrestricted smoothly varying topographic features and continuously varying thickness.

FIG. 6 is a cross-sectional view of a steel rod of diameter D to be used as a mold insert, at the working end of which is affixed the electroplated metal impression of FIG. 5, after having been separated from the substrate. An enlarged view of the working end of this mold insert is also provided.

BEST MODE FOR CARRYING OUT THE INVENTION

Figure 1A:
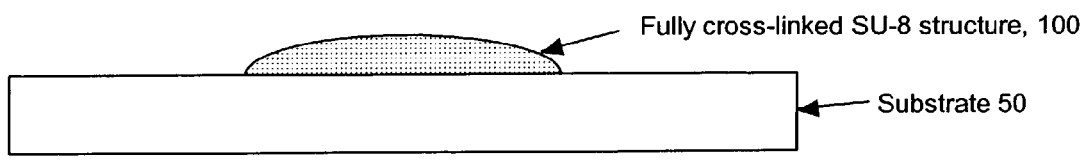
FIG. 1A is a cross-sectional view of a transparent substrate upon which a fully cross-linked structure has been fabricated using SU-8 resin, said structure having unrestricted smoothly varying topographic features and continuously varying thickness, such as a lens-like structure.

A new process is described for fabricating mold inserts comprising an unrestricted smoothly varying surface and the polymeric structures comprising an unrestricted smoothly varying surface, such as an integrated optical structure, that may be made in molds comprising such inserts.

Suppose that a mold is required for fabrication of an injection molded integrated optical structure comprising an optical element whose surface elevation is described mathematically by a smoothly varying function $z(r, \theta)$. The quantity z represents the deviation of the surface elevation of said optical element normal to a local reference plane as one moves radially away a distance r from a selected reference origin in a direction defined to be $\theta$ degrees away from a selected reference direction, both r and $\theta$ defined in said reference plane. Said optical element may be further specified as requiring a clear aperture of radius $R_c$, which means that within said clear aperture radius, said lens element surface must conform to said function $z(r, \theta)$, but that outside of this radius, the surface elevation may deviate from said function. The maximum value of said function z is called the sag, and represents the thickness of the thickest portion of said optical element. Suppose further that the mold maker requires that said optical element is to be fabricated through the use of a mold insert of diameter D, wherein $D > 2 R_c$.

In a preferred embodiment of this invention, the first step of the process is to select a thin substrate 50, transparent or essentially transparent to the light needed for polymerization of SU-8 resin, which is a negative-acting photosensitized epoxy-based photoresist material. Additional information about SU-8 resin is provided in U.S. Pat. No. 6,635,412, which is hereby incorporated by reference. Said light needed for polymerization of SU-8 resin generally comprises wavelengths between 250 and 450 nanometers (nm) and more particularly between 300 and 400 nm, with preferred wavelengths between 350 and 370 nm. Thus, appropriate substrates include most glasses, quartz, and a variety of polymers.

In the next step of the process, a solid, fully cross-linked epoxy structure whose surface conforms to the shape of said optical element is formed on the substrate. This is accomplished through the following steps:

Step One: Clean said substrate and apply an adhesion-promoter, if desired and/or necessary, such as hexamethyl-disilazane (HMDS).

Subsequent steps are done in a room in which green, blue and UV light are excluded (orange room), since SU-8 resin is sensitive to short wavelength visible and near ultraviolet light.

Step Two: Spin-on or otherwise apply a layer of SU-8 resin at least as thick as said sag, such as 0.5 mm. If this cannot be done at one time, spin on as thick a layer as practical. The starting material is a viscous liquid mixture of SU-8 resin (typically bisphenol A novolac glycidyl ether), a solvent for SU-8 resin such as γ-butyrolactone (GBL) or propylene glycol methyl ether acetate (PGMEA), and a photo-acid generator such as a triaryl sulfonium salt (e.g. Cyracure UVI, Union Carbide Corp.). Varying the ratio of resin to solvent yields mixtures with different viscosities at room temperature. One selects the mixture that will permit spinning the layer of desired thickness at spin speeds between approximately 500 and 5000 rpm. For some applications, the thickness of the applied SU-8 resin layer may be 10%–20% thicker than said sag (or possibly even thicker). In other applications, the thickness of the applied SU-8 resin layer may match that of said sag.

Step Three: The substrate with its spun-on layer is permitted to rest on a level surface so that the viscous SU-8 resin layer can flatten, and then the substrate is placed on a level hotplate with final temperatures in a range of 80° C. to 150° C. with a preferred temperature of approximately 95° C. (softbake). This step causes evaporation of the solvent from the layer. As the solvent evaporates, the SU-8 resin layer that remains on the substrate becomes more viscous. However, it remains a liquid at 95° C. since even pure SU-8 resin has a glass transition temperature of approximately 55° C.

Step Four: When the solvent has evaporated from the spun-on layer, the substrate is removed from the hotplate and cooled to room temperature. At room temperature, the SU-8 resin layer is a solid.

If a thicker layer is required, Steps Two, Three and Four may be repeated.

Step Five: Expose the SU-8 resin layer from the substrate side for a desired exposure time, using polymerizing light (i.e., light characterized by a wavelength, wavelength range, or spectral content that may result in appropriate polymerization or cross-linking within the SU-8 resin layer, generally light comprising wavelengths between 250 and 450 nm and more particularly between 300 and 400 nm, with preferred wavelengths between 350 and 370 nm.). The light may be patterned by transmission through a gray-tone mask, which is a flat thin plate of generally transparent material that has areas of higher and lower transparency to said polymerizing light, said areas permitting more or less polymerizing light to pass through, with the preferred result that a continuum of intensities may be transmitted, resulting in a continuum of exposure doses. Exposure may be carried out on a mask aligner, and the mask may be first positioned to align with structures already on the substrate. Other methods for exposing areas of the SU-8 resin layer with different doses of polymerizing light are also possible, such as using a modulated beam scanning device, or transmitting polymerizing light through a device comprising an array of controlled shutters or partially transmissive elements, or through a device comprising an array of position-controlled mirrors, or the equivalent.

Regardless of the particular type of exposure system employed, the areas of the SU-8 resin layer that are exposed to a greater light dose will cross-link from the substrate interface through a greater film thickness than areas that are exposed to a lesser dose. An important consideration in designing the gray-tone mask, or any other variable exposure means for controlling the local dose of the exposure, is a measured characteristic of SU-8 resin that describes the thickness of polymerized SU-8 resin that will result as a function of exposure dose for said polymerizing light used to expose the film.

Specifically, let us define E(t) to be the mathematical function that describes the exposure dose E that is required to produce a thickness, t, of polymerized SU-8 resin, wherein E is measured in joules/meter$^2$ and t is measured meters, and wherein said function E(t) is readily derivable from said measured characteristic. Since the required thickness of polymerized SU-8 resin is given by z(r, θ), then E[z(r, θ)] describes the required exposure to the SU-8 resin layer as a function of r and θ, that will cause the SU-8 resin to polymerize to the thickness given by z(r, θ). Assuming that the light source used for exposure of the SU-8 resin layer has a uniform intensity of $I_0$ watts/meter$^2$, then said gray-tone mask may be used that has a light transmission characteristic, T(r, θ), for said polymerizing light, given by the mathematical function $$T(r, θ)=E[z(r, θ)]/I_0τ$$

where τ is the exposure time measured in seconds, and the product $I_0τ$, which has the units of joules/meter$^2$, is greater than the maximum value of said required dose, E[z(r, θ)], at any point (r, θ).

Step Six: Place the substrate with its exposed SU-8 resin layer on a hotplate, with final temperatures of between 95° C. and 150° C. This step greatly accelerates the cross-linking of the SU-8 resin in the areas exposed to the polymerizing light. However, since SU-8 resin has a known absorption length for the light used in the exposure step, regions of the exposed resin film nearest the substrate will receive higher doses than regions further from the substrate. For each formulation of SU-8 resin, there exists a minimum exposure dose that is required to effect sufficient cross-linking such that the resin so exposed and cross-linked will be a solid at 95° C. Regions of the SU-8 resin layer which do not receive this minimum exposure dose will remain unpolymerized, and therefore liquid, at 95° C. Said substrate remains on said hotplate until the cross-linking process in the SU-8 resin has saturated, which may take up to one hour. Said substrate is then cooled to room temperature.

Step Seven: Develop the exposed SU-8 resin layer. The standard method recommended by the manufacturer of SU-8 resin involves placing the substrate with its exposed SU-8 resin layer in a bath or in a sequence of baths containing a solvent for unpolymerized SU-8 resin, preferably such as γ-butyrolactone (GBL) or propylene glycol methyl ether acetate (PGMEA). Other solvents may also be used, such as acetone or various alcohols. In these baths, the unexposed and unpolymerized areas of the SU-8 resin film are dissolved away and ideally only the polymerized areas remain attached to the substrate. Although solvent development techniques may be effective in removing unexposed SU-8 resin photoresist, such solvent development techniques tend to leave the surface of the remaining polymerized SU-8 resin film rough (with surface roughness of as much as 2 μm rms). The remaining polymerized SU-8 resin structures also tend to absorb solvent and swell, thus distorting their size and shape. The swelling can undesirably increase the volume of polymerized structures by 30% or more, and can leave them permanently deformed, even after the solvent has been fully removed from the remaining polymerized structures. Solvent swelling can also cause SU-8 resin structures to lift off the substrate due of the strain at the interface between the substrate and the swelled SU-8 resin.

Solvent swelling may be an unavoidable consequence of solvent development because the polymerized SU-8 resin at this point in the process is weakly cross-linked. It is polymerized just sufficiently to be solid at 95° C. Typically, SU-8 resin manufacturers recommend much higher doses of polymerizing light to fully polymerize the SU-8 resin layers. The polymerized SU-8 resin that results from exposure to higher doses of polymerizing light are so completely cross-linked that solvent development does not cause significant solvent swelling.

In the context of the present invention, a more suitable development procedure may comprise a technique referred to herein as hot-flow development. Hot-flow development relies upon a physical distinction between polymerized (solid) and unpolymerized (liquid) SU-8 resin at a given hot-flow development temperature. For SU-8 resin, said hot-flow development temperature may be between 75° C. and 150° C., with a preferable range of 95° C. to 115° C. A first preferred variant of hot-flow development is hot-spin development. In hot-spin development, the substrate (upon which the exposed SU-8 resin layer or film resides) is placed on a spinner and heated to said hot-flow development temperature. The heating may be performed, for example, via a heated spinner chuck, or by blowing heated air onto the SU-8 resin film on the substrate while it is mounted on the spinner, and/or by irradiation with infrared light or some other effective means.

When the SU-8 resin film reaches said hot-flow development temperature, the exposed and polymerized regions of the film will be solid, but the regions of the film that have not been exposed to the minimum exposure dose required for polymerization remain liquid. In many regions of the film, liquid unpolymerized SU-8 resin may be lying above solid, polymerized SU-8 resin. The heated wafer may be spun at rates as high as 7000 rpm. As a result, the liquid unpolymerized SU-8 resin may be spun off the wafer by the centripetal forces, leaving only a thin layer of liquid unpolymerized SU-8 resin still adhering to the substrate and/or to the underlying solid, polymerized SU-8 resin. The thickness of this thin adherent layer depends upon SU-8 resin viscosity and surface tension forces at said hot-flow development temperature, but may be minimized by using higher spin rates, longer spin times and higher hot-flow development temperatures. The thickness of this film of adherent unpolymerized SU-8 resin can be reduced to a few microns, although it tends to adhere in thicker volumes at concave corners in the polymerized SU-8 resin structures.

At this point, a second variant of the hot-flow development procedure may be employed. In this variant, the unexposed SU-8 resin still adherent to the substrate and to the polymerized SU-8 resin structures may be further removed by blowing heated gas at high velocity at the liquid unpolymerized SU-8 resin using a fine nozzle which creates a jet of heated gas. In one embodiment, the liquid unpolymerized SU-8 resin may be propelled out of the concave corners of the structures using this technique with a practiced hand while observing the process under a low-power stereo microscope. Alternatively, a motorized chuck upon which the substrate is held may be manually, semi-automatically, or automatically positioned beneath such a nozzle, where such positioning may be aided by a microscope or vision system, to facilitate removal of unpolymerized SU-8 resin.

In general, hot-flow development methods rely upon inherent differences in viscosity between polymerized and unpolymerized SU-8 resin at or above said hot-flow development temperature. Those skilled in the art will understand that the present invention may additionally or alternatively employ multiple variations of the hot-flow development method described above. SU-8 resin films developed by hot-flow methods may exhibit surface roughness typically less than 200 nm rms, and do not suffer from solvent swelling and/or delamination from the substrate that results from the excessive strain produced by such swelling.

Step Eight: The heated substrate with its polymerized SU-8 resin structure on the substrate whose surface conforms to the shape of said optical element with smoothly varying topographic features is permitted to cool.

Step Nine: It is now necessary that said polymerized SU-8 resin structure be fully cross-linked and dimensionally stabilized and rendered immune to solvent swelling. This is done by exposing said polymerized SU-8 resin structure to a sufficiently large dose of polymerizing light and then post-heating the substrate with said polymerized SU-8 resin structure to between 95° C. and 150° C. for a sufficient period of time to affect full cross-linking of said polymerized SU-8 resin structure, resulting in a structure 100 as shown in FIG. 1A.

Figure 1B:
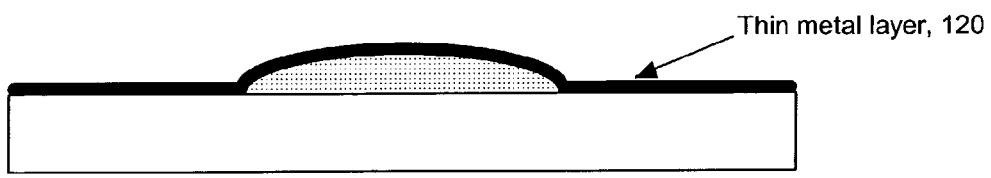
FIG. 1B is a cross-sectional view as in FIG. 1A with a thin metal layer deposited on top of the substrate and fully cross-linked SU-8 resin structure.

The next step of the process is to prepare the structure for plating a metal body around said fully cross-linked SU-8 resin structure whose surface conforms to the shape of said structure. This is done by depositing one or more thin layers of metal 120 over said fully cross-linked SU-8 resin structure and the surrounding substrate, as shown in FIG. 1B, by any number of methods known to those skilled in the art.

Figure 2:
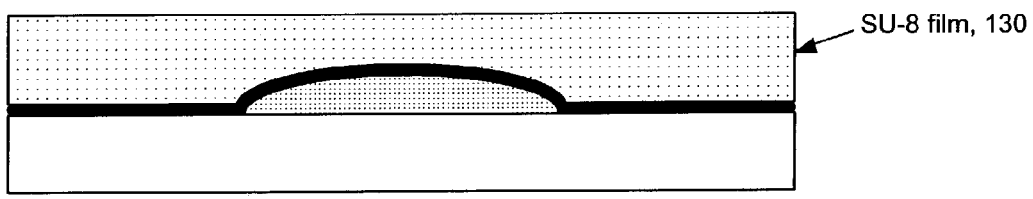
FIG. 2 is a cross-sectional view as in FIG. 1B with an additional film of SU-8 resin deposited over the thin metal layer.
Figure 3B:
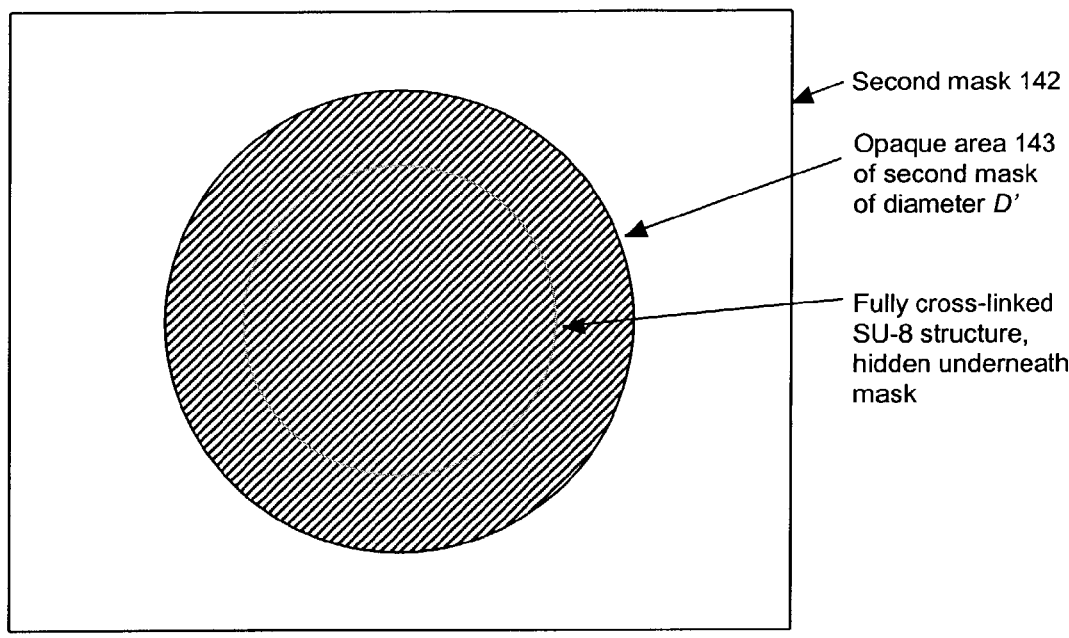
FIG. 3B is a view from above of the structures shown in FIG. 3A.
Figure 3A:
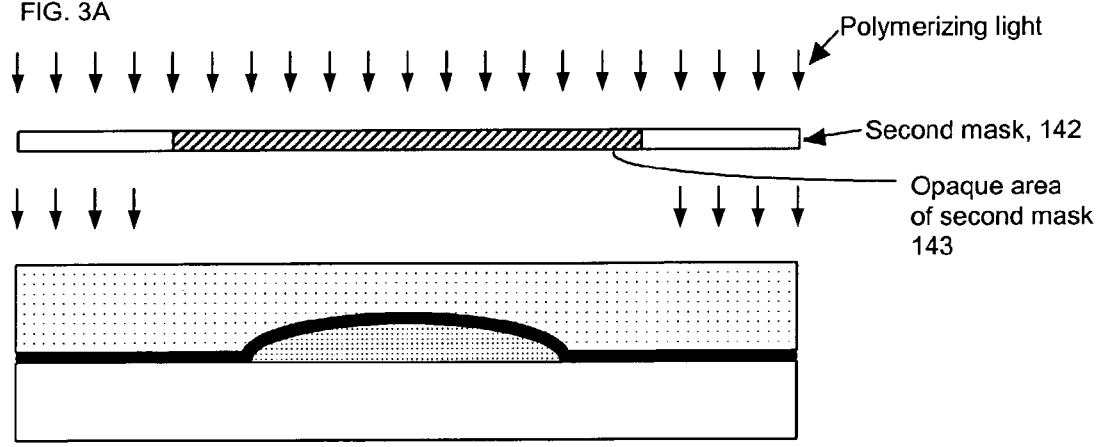
FIG. 3A is a cross-sectional view showing the exposure of the additional film of SU-8 resin with polymerizing light, said light propagating through a second mask having a substantially opaque area that prevents said polymerizing light from exposing the additional SU-8 resin film within diameter D' generally aligned and concentric with said fully cross-linked SU-8 resin structure.
Figure 3C:
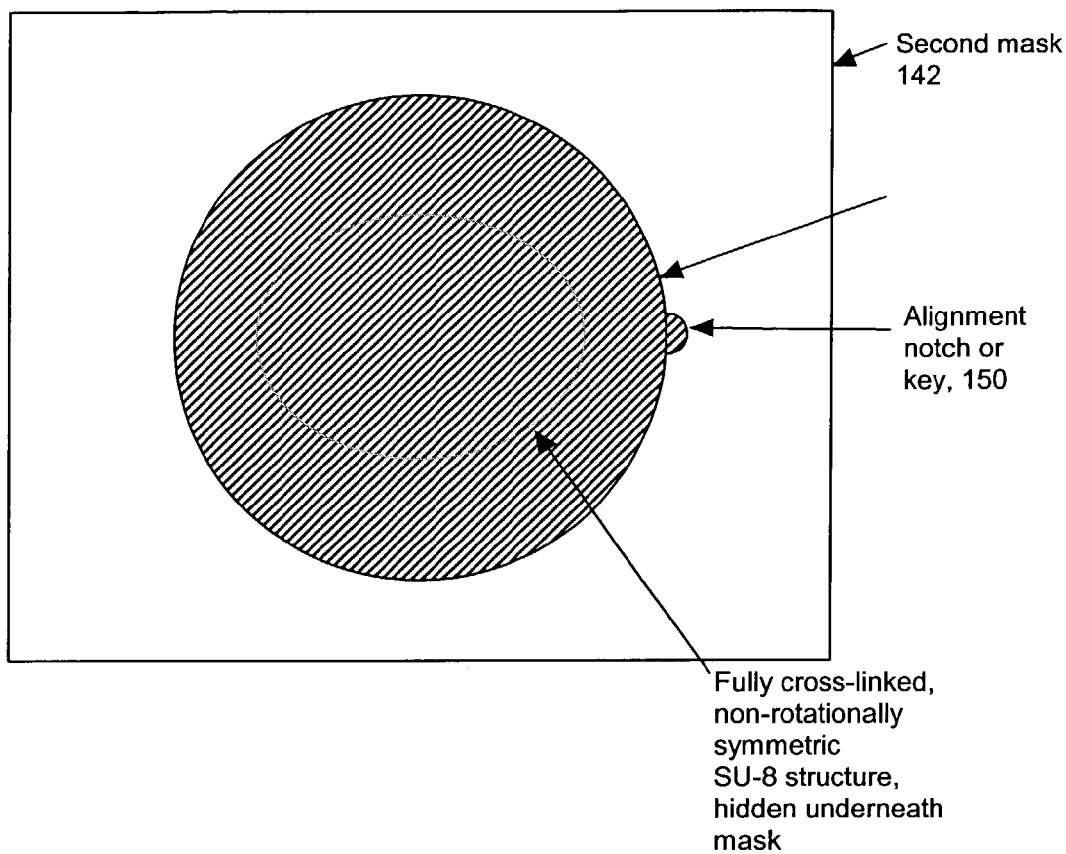
FIG. 3C is a view from above of the structures shown in FIG. 3A in the case where the fully cross-linked SU-8 resin structure is not rotationally symmetric, and the substantially opaque region of the second mask has a notch or key to be used for rotational alignment of the mold insert.

The next step in the process is to deposit one or more layers 130 of SU-8 resin and expose and develop a fully cross-linked, generally circular well 140 having a diameter D', larger than $2R_c$ but smaller than or equal to diameter D, and having a height, H, greater than said sag, in said one or more layers of SU-8 resin surrounding said fully cross-linked SU-8 resin structure. The deposition process is done by spinning on an additional film of at least one layer of SU-8 resin, leveling the film and evaporating the solvent as described above in Steps Two, Three and Four, with the result as shown in FIG. 2. In the next step of the process, this additional SU-8 resin film is exposed from the film side of the substrate with said polymerizing light through a second mask 142 having a substantially opaque region 143 that prevents said polymerizing light from exposing the SU-8 resin film within said diameter D', generally aligned and concentric with said fully cross-linked SU-8 resin structure, as shown in FIG. 3A and FIG. 3B. The exposure is of a large enough dose to subsequently cause the exposed regions on the SU-8 resin to become fully cross-linked throughout the thickness of said additional film. In the event that said fully cross-linked structure 100 is not rotationally symmetric, and that it is desirable to provide an alignment indicator so that the mold insert may be placed with the proper rotational alignment in the mold, a key or notch feature aligned with a reference axis of said fully cross-linked structure may be made in said generally circular well by providing said feature 150 in said second mask 142.

Said deposition and exposure processes may be repeated one or more times so as to fashion a deeper well or a well with more vertical side walls than can be obtained with one application of said deposition and exposure processes.

Figure 4:
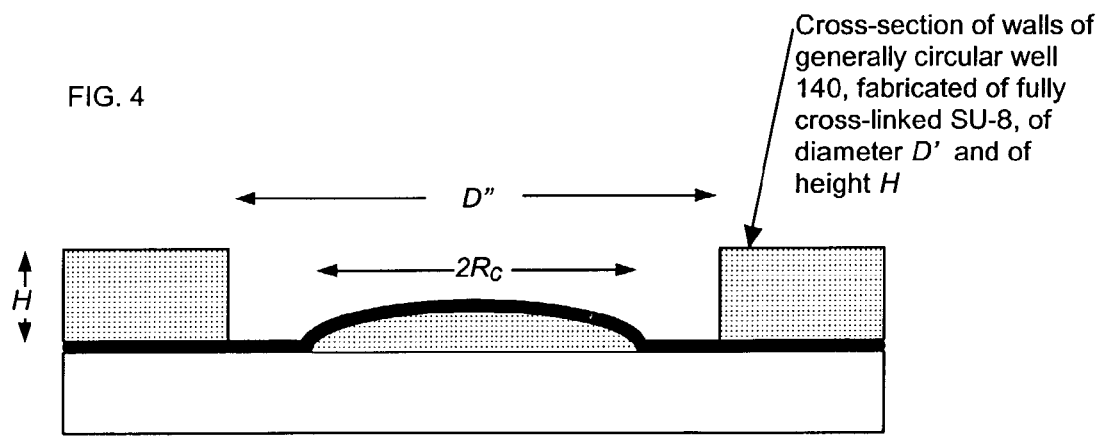
FIG. 4 is a cross-sectional view of the structures in FIG. 1B with the addition of a generally circular well fabricated of fully cross-linked SU-8 resin, of diameter D' and of height H.

The development process of said generally circular well 140 is done by first heating the substrate with its exposed SU-8 resin film on a hotplate, with final temperatures of between 95° C. and 150° C., until said generally circular well is fully cross-linked, which may take up to one hour. Said substrate is then cooled to room temperature. Then, said generally circular well is further developed by removing the unexposed and unpolymerized SU-8 resin, either by using standard solvent development or hot-flow development, or a combination of such development methods, resulting in a structure as shown in FIG. 4.

The next step of the process is to fashion a metal impression of said fully cross-linked structure by making electrical contact to said thin layer of metal deposited previously, and electroplating a metal, which may be nickel or a nickel-containing alloy, onto the regions of the substrate where said thin layer of metal is not covered with SU-8 resin, using an electroplating process known to those skilled in the art. The electroplating continues until its thickness is sufficient, generally greater than said sag and less than or equal to the height of said generally circular well, H, resulting in an electroplated metal impression structure 160 as shown in FIG. 5.

The next step of the process is to separate said metal impression whose surface conforms to the shape of said fully cross-linked SU-8 resin structure 100 from said substrate and affix said metal impression into the end of a steel rod 170, as shown in FIG. 6. This completes the process of fabrication of the mold insert.

As it will be obvious to those skilled in the photolithographic art, many metal impressions, having either identical or different smoothly varying topographic features, may be fabricated simultaneously on the same substrate, by using masks that form, simultaneously at each respective step of the process, the corresponding fully cross-linked structures in SU-8 resin and their associated generally circular wells, spaced apart on the same substrate. This parallel process significantly reduces the cost of the fabrication of mold inserts, which if made by diamond turning, must be made sequentially, each one taking the same amount of time for production as the next.

Once the mold insert is fabricated, it is placed in a previously prepared mold insert hole in a previously prepared mold. If said mold insert has a notch or key to assure proper rotational alignment of the mold insert in the mold, then the mold insert hole will also have a matching alignment notch or key.

The completed mold comprising a mold insert fabricated according to the present invention may be used in an injection molding machine to fabricate plastic structures comprising a 3-D structure with unrestricted smoothly varying topographic features and continuously varying thickness which may be either rotationally symmetric or asymmetric. This constitutes a major advance in the art related to the fabrication of molds and in the art of making injection molded structures such as integrated optical structures.

The invention claimed is:

1. A method for making a mold component for a mold which is useful in injection molding of small structures, comprising the steps of:
   forming a solid epoxy member on a substrate, the epoxy member having an upper surface which conforms to a desired configuration associated with a portion of a component to be formed by injection molding, the epoxy member further having a selected peripheral boundary and a selected thickness;
   depositing at least one first layer of metal on said epoxy member, said first metal layer extending to a first metal layer boundary on said substrate, the first metal boundary extending beyond the peripheral boundary of the epoxy member; wherein an upper surface of said first layer of metal conforms to said desired configuration;
   depositing a layer of epoxy on first said first metal layer, the epoxy layer having a peripheral boundary greater than the peripheral boundary of said epoxy member and a height which extends above the first metal layer;
   removing resin from said first layer of epoxy to create a remaining well region having an inner peripheral boundary which is greater than the peripheral boundary of the epoxy member, but less than the first metal boundary, wherein the remaining well region is then processed such that it is fully cross-linked;

depositing a metal impression layer within the remaining well region, covering the first metal layer, therein; and separating the metal impression layer from the remaining well region and affixing it to a mounting member as a mold component.

2. A method of claim 1, wherein the epoxy member is a negative-acting photosensitized epoxy-based photoresist material and the epoxy layer is a negative-acting photosensitized epoxy-based photoresist material.

3. A method of claim 2, wherein the step of forming the epoxy member includes the steps of applying a layer of said photoresist material at least as thick as the selected thickness to the substrate; heating the photoresist layer to evaporate any solvent therein; cooling the layer until it becomes a solid; exposing the photoresist layer using polymerizing light through a mask related to the configuration of the epoxy member; developing the exposed photoresist layer and heating the photoresist layer such that regions of the photoresist layer that have not been exposed to a selected minimum dosage of polymerizing light can be conveniently removed; cooling the remainder of the photoresist layer; and exposing the remainder to polymerizing light, resulting in the epoxy member.

4. A method of claim 3, wherein said regions are removed by a step of spinning the light-exposed, heated photoresist layer.

5. A method of claim 3, wherein said regions are removed by a step of blowing heated gas at high velocity at the light-exposed, heated photoresist layer.

6. A method of claim 1, wherein the step to create a remaining well region includes the steps of masking the epoxy layer in such a manner and then exposing the masked epoxy layer with polymerizing light that the unexposed portion of the epoxy layer can be removed, leaving the remaining well region, which is then developed to become fully cross-linked.

7. A method of claim 6, wherein the steps of depositing, masking, exposing and developing to produce the well region are carried out in more than one successive sequence.

8. A method of claim 1, wherein the step of forming the metal impression is carried out by electroplating.

9. A method of claim 1, wherein the step of forming the well region includes forming an alignment indicator which permits the metal impression layer on the mounting member to be positioned in a proper rotational alignment in the mold.

10. A method of claim 1, wherein the metal impression layer has a smoothly varying surface configuration in accordance with the function $z(r,\theta)$, where z is the deviation of the surface elevation of the surface configuration, at a distance r from a selected reference point, at any angle $\theta$ in a selected reference direction.

* * * * *

UNITED STATES PATENT AND TRADEMARK OFFICE
CERTIFICATE OF CORRECTION

| | | |
|---|---|---|
| PATENT NO. | : 7,045,089 B2 | Page 1 of 1 |
| APPLICATION NO. | : 10/340244 | |
| DATED | : May 16, 2006 | |
| INVENTOR(S) | : Martin A. Afromowitz | |

It is certified that error appears in the above-identified patent and that said Letters Patent is hereby corrected as shown below:

Claim 1, line 16, the first occurrence of the term "first" should be deleted.

Signed and Sealed this

First Day of August, 2006

JON W. DUDAS
*Director of the United States Patent and Trademark Office*